Oct. 22, 1968   R. C. MILLER   3,407,309
GENERATION OF SECOND HARMONIC OPTICAL WAVE ENERGY
Filed Aug. 1, 1963

INVENTOR
R. C. MILLER
BY
*Arthur J. Torsiglieri*
ATTORNEY

United States Patent Office 3,407,309
Patented Oct. 22, 1968

3,407,309
GENERATION OF SECOND HARMONIC
OPTICAL WAVE ENERGY
Robert C. Miller, Basking Ridge, N.J., assignor to Bell
Telephone Laboratories, Incorporated, New York, N.Y.,
a corporation of New York
Filed Aug. 1, 1963, Ser. No. 299,412
6 Claims. (Cl. 307—88.3)

This invention relates to the utilization of a nonlinear medium to generate nonlinear products, such as harmonics and difference and sum frequencies in the optical range, both visible and invisible. The invention has primary application to the generation of second harmonics and will be discussed in particular detail with respect to such application.

Because of the difficulty in generating directly very short optical wavelengths, it is often easier to generate harmonics of a fundamental relatively longer wavelength to achieve a desired shorter optical wavelength. Various techniques are now known for this purpose, although most characteristically are of low efficiency.

I have discovered that second harmonic generation can be achieved with relatively high efficiency by the use as the nonlinear element of a ferroelectric element polarized to have a succession of substantially anti-parallel ferroelectric domains in the direction of the fundamental wave passing through the element.

In the same way, a ferroelectric crystal appropriately polarized with antiparallel domains can serve as the nonlinear element to mix two optical waves of different wavelength to provide a desired difference or sum product.

The invention will be better understood from the following description taken in connection with the accompanying drawing, in which.

Figure 1:
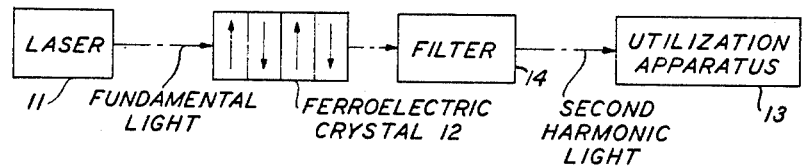
FIG. 1 shows schematically an arrangement for the second harmonic generation of light in accordance with the invention.

With reference now to the drawing, in the harmonic generator shown in FIG. 1, a source of the fundamental wave 11, which may be a laser of any of the known types, irradiates a ferroelectric crystal 12, which ideally has a succession of substantially antiparallel domains (180 degree change in the spontaneous polarization), the domains being arranged so that the fundamental wave passes through the successive domains in turn, as shown. Advantageously although not necessarily, the incident wave is arranged to have a plane of polarization in the crystal parallel to the polarization of the crystal. Suitable utilization apparatus 13 is aligned on the opposite side of the ferroelectric crystal to receive the transmitted desired second harmonic. Ordinarily, it will be desirable to insert an optical filter 14 between the ferroelectric crystal and the utilization apparatus 13 to remove light of unwanted wavelengths, such as the fundamental. In some instances, if the laser 11 provides extraneous wavelengths, it will be desirable to insert a filter (not shown) between source 11 and the crystal 12.

Typically, the source 11 can be a ruby laser or a neodymium-doped calcium tungstate laser, and the crystal 12 can be of barium titanate or triglycine sulfate, although a wide variety is possible. While, surprisingly, harmonic generation is ordinarily possible even when the ferroelectric crystal is not particularly transparent to the harmonic, for the practice of this invention it is important that the ferroelectric crystal be transparent to the desired harmonic. Of course, the ferroelectric crystal, too, should be transparent to the fundamental wave.

Figure 2:
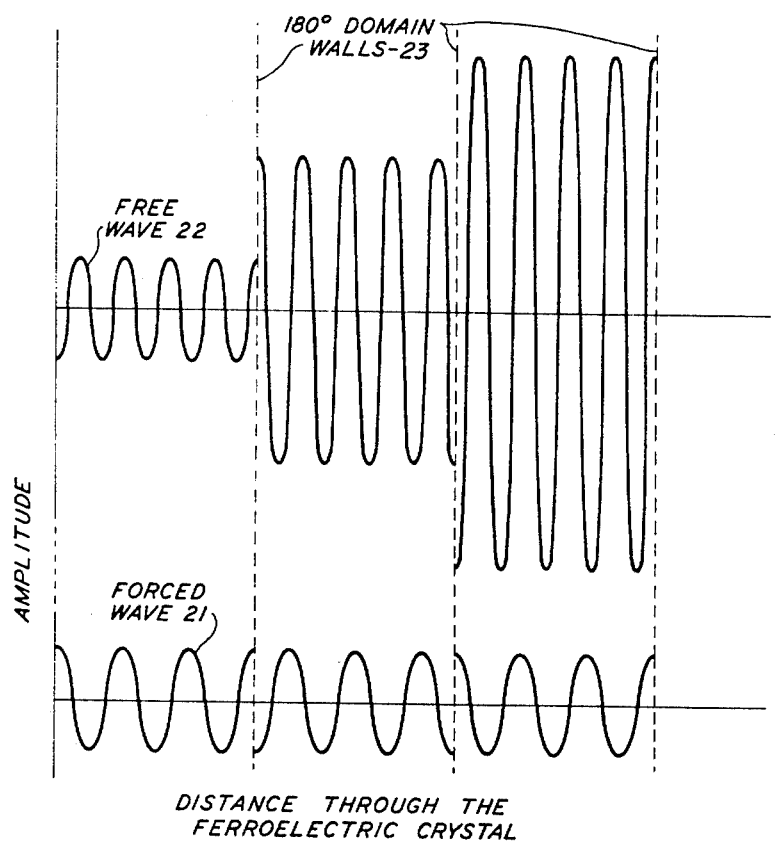
FIG. 2 is a diagram of some wave forms which will be helpful in explaining the principles of the invention.

The invention in its ideal form can be explained in connection with the plot shown in FIG. 2. In particular, it is found that when the fundamental wave enters the ferroelectric crystal, nonlinearities in the crystal give rise to two waves corresponding to the second harmonic for each particular nonlinear coefficient involved in the harmonic generation process. The first wave, resulting from a non-linear second order polarization and shown as line 21 in the drawing, to be termed the "forced wave," is tied to the fundamental and, accordingly, travels in the crystal at the same velocity as the fundamental. Its plane of polarization is determined by the nonlinear coefficient involved in the harmonic generation process. For purposes of illustration, barium titanate is chosen as the ferroelectric, and there is considered the $d_{33}$ nonlinear coefficient. This choice has the advantage that all polarizations including the ferroelectric polarization are in the same plane. The second wave, arising out of a need to satisfy the boundary conditions of Maxwell's equations, shown as line 22 in the drawing, to be termed the "free wave," travels in the crystal at a different velocity because of the dispersive nature of the crystal. When set up in the crystal, these two waves are of equal amplitude but of opposite phase. However, because of the differences in velocities, they tend to get in and out of phase as they propagate in the crystal. For appropriate nonlinear interactions, the phase of the forced wave undergoes a 180 degree change as it traverses a domain wall of the crystal where the ferroelectric polarization undergoes a 180 degree change in direction. Now, if the two waves are in phase as they meet a domain wall, illustrated by the broken vertical line 23 in the drawing, the boundary conditions required by Maxwell's equations result in an increase in the instantaneous amplitude of the free wave of twice the instantaneous amplitude of the forced wave on the other side of the domain wall. Viewed in a somewhat different fashion, the change in electric field of the forced wave amounting to twice the amplitude resulting from a 180 degree phase shift is transferred to the electric field of the free wave, whereby its amplitude is increased correspondingly. If each domain wall corresponding to a 180 degree phase shift in the electric field of the forced wave is located at a point where the electric fields of the forced and free waves are in phase, there will be a corresponding transfer, increasing the field of the free wave. Accordingly, by spacing apart successive domain walls the distance corresponding to that required for the forced and free waves to undergo a relative phase shift of 180 degrees, a distance to be termed a coherence length, the free wave can be made to grow in amplitude. It can be seen that cumulative action can be achieved if successive domain walls are spaced any odd integral value of the coherence length. In fact, growth of the free wave will occur if the sign of the electric fields of the two waves is the same as they approach a domain wall. The intensity of the second harmonic which one measures is the result of the interference between the two waves and effectively is related to the square of the vector sum of the electric fields of the two waves. It has been found in practice that some increase in the efficiency of the harmonic generation above that of a single domain crystal occurs when the ferroelectric crystal is treated to provide a large number of domains otherwise randomly located, provided the domain walls predominantly extend transverse to the direction in which the fundamental wave propagates through the crystal, although the efficiency is the higher the more the ideal conditions set forth are met.

As expected, the coherence length is dependent on the wavelength of the fundamental and the properties of the ferroelectric crystal. In particular, the coherence length $L_c$ for the second harmonic is equal to the wavelength of the fundamental $\lambda_F$ in free space divided by four times the difference of the index of refraction in the ferroelectric crystal of the second harmonic and the index of refraction in the ferroelectric crystal of the fundamental.

For example, for fundamental light having a wavelength of 1.06 microns, as is produced by a neodymium-doped calcium tungstate optical maser, the coherence length for the second harmonic in barium titanate involving use of the $d_{33}$ nonlinear coefficient is 2.05 microns. With a 3 millimeter square crystal of typical thickness of about .25 millimeter (corresponding to 125 coherence lengths), the intensity of the second harmonic generated ideally can be increased by a factor of thousands over that provided by a single domain crystal. In practice, an increase by a factor of more than ten is readily achieved without critical adjustment of the crystal domain pattern.

At the present state of the art, it is difficult to control the distance separating domain walls in a ferroelectric crystal. However, as previously indicated, enhancement of the efficiency of harmonic generation can be achieved even though the optimum relations between coherence lengths and domain wall separations are not met.

To realize a ferroelectric crystal which includes a plurality of domain walls which are aligned so that the net effect is that the fundamental light encounters a succession of domain walls in its travel through the crystal, it is advantageous first to treat the crystal so that it includes a single domain, with the direction of polarization normal to the desired direction of propagation of the fundamental light through the crystal. This can typically be done by applying a steady electric field of adequate strength across the crystal aligned in the direction desired to polarize the crystal. Thereafter, anti-parallel domains may be created in the crystal in the desired direction by cycling the applied electric field at a rate faster than the polarization of the crystal can be completely switched whereby only partial switching or reversal occurs. Typically, it is convenient to arrive at the satisfactory domain pattern empirically, sometimes repeating the process several times to reach a satisfactory pattern.

Another method for achieving useful domain arrays suitable for use with crystals which undergo second or higher order ferroelectric transitions, such as triglycine sulphate, Rochelle salt and KDP, involves forming the domain pattern as the crystal goes from the paraelectric to the ferroelectric phase, which is determined by the minimum free energy.

A combination of electrical and thermal treatments also may be used.

As is known, once a desired domain pattern is obtained, it can be modified in a reversible manner with an applied electric field. Accordingly, amplitude modulation of the second harmonic intensity produced by the invention can be achieved by modulating an external electric field applied to the crystal.

Figure 3:
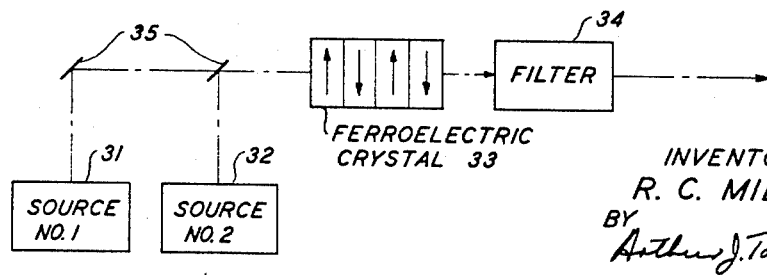
FIG. 3 shows schematically an arrangement for mixing of light from two sources, in accordance with the invention.

In FIG. 3, there is shown apparatus for mixing the light from two sources 31 and 32, typically lasers of different wavelengths, to achieve a desired mixed frequency. To this end, there is chosen a ferroelectric crystal 33 having a succession of antiparallel domains arrayed in the direction along which the two light waves are transmitted therethrough. The crystal is chosen to transmit the two light waves and the desired product and to exhibit satisfactory nonlinear properties at the operating wavelengths. A filter 34 is positioned in the path of the exiting light to remove the undesired components and transmit the desired product for utilization.

As was the case for second harmonic generation, maximum conversion efficiency is realized when the successive domain walls are spaced a coherence length although such spacing is not ordinarily critical for achieving some enhancement of the conversion efficiency over the case of a single domain crystal.

For superposing the two waves for passage through the crystal, reflecting elements 35 are included. In practice, the simple arrangement depicted would be modified in a manner known to workers in the art.

What is claimed is:

1. Apparatus for generating the second harmonic of optical wave energy comprising means supplying the optical wave energy, a ferroelectric crystal characterized by a succession of substantially antiparallel domains in the path of the optical wave energy, such that the wave passes through the antiparallel domains successively, the crystal being transparent both to the wave energy and to the second harmonic thereof, and means for selecting for utilization from the light exiting from the crystal second harmonic wave energy.

2. Apparatus in accordance with claim 1 in which successive domain walls are separated by substantially a coherence length.

3. Apparatus in accordance with claim 1 in which the means supplying the optical wave energy is a neodymium-doped calcium tungstate crystal and the ferroelectric crystal is of barium titanate.

4. Apparatus for generating the second harmonic of optical wave energy comprising an optical laser, a ferroelectric crystal characterized by a plurality of substantially antiparallel domains positioned to receive substantially monochromatic optical wave energy from said laser, such that the wave energy from said laser passes transversely across the antiparallel domains, the crystal being transparent both to the laser wave energy and to the second harmonic thereof, and means disposed to receive the wave energy exiting from the crystal for selecting therefrom for utilization the second harmonic wave energy.

5. Apparatus for mixing two optical waves of different wavelength comprising means supplying the two waves, a ferroelectric crystal characterized by a succession of substantially antiparallel domains positioned in the path of the two waves such that the waves are superposed and pass through the antiparallel domains successively, the crystal being transparent to the two waves and the desired nonlinear product, and means for selecting for utilization from the light exiting from the crystal the desired frequency.

6. In combination, a nonlinear element comprising a ferroelectric crystal characterized by a succession of substantially antiparallel domains, means for directing optical wave energy containing at least two wavelengths through the crystal such that the optical wave energy passes transversely across the antiparallel domains, the crystal being transparent both to the optical wave energy and to a nonlinear product thereof, and means disposed to receive the wave energy exiting from the crystal for selecting therefrom for utilization the desired product.

References Cited

Boyne et al.: "Experimental Determination of the Frequency Ratio of Optical Harmonics," JOSA, vol. 52, No. 8 (August 1962), pp. 880–884.

Franken et al.: "Generation of Optical Harmonics," Physical Review Letters, vol. 7, No. 4 (Aug. 15, 1961), pp. 118 and 119.

Javan et al.: "Frequency Characteristics of a Continuous-Wave He-Ne Optical Maser," JOSA, vol. 52, No. 1 (January 1962), p. 96.

Maker et al.: "Effects of Dispersion and Focusing on the Production of Optical Harmonics," Physical Review Letters, vol. 8, No. 1 (Jan. 1, 1962), pp. 21 and 22.

JEWELL H. PEDERSEN, *Primary Examiner.*

W. L. SIKES, *Assistant Examiner.*